United States Patent [19]

MacGregor

[11] 4,134,073
[45] Jan. 9, 1979

[54] CLOCK SYSTEM HAVING ADAPTIVE SYNCHRONIZATION FEATURE

[75] Inventor: William W. MacGregor, Wellesley, Mass.

[73] Assignee: Honeywell Information Systems Inc., Waltham, Mass.

[21] Appl. No.: 704,219

[22] Filed: Jul. 12, 1976

[51] Int. Cl.² .................... H03K 1/17; H03K 5/159
[52] U.S. Cl. ........................ 328/63; 307/208; 307/293; 328/56; 328/62
[58] Field of Search ............ 328/55, 56, 62, 63; 307/208, 293, 269

[56] References Cited

U.S. PATENT DOCUMENTS

| | | | |
|---|---|---|---|
| 3,386,036 | 5/1968 | Gerrard et al. | 328/56 |
| 3,418,498 | 12/1968 | Farley | 307/208 |

OTHER PUBLICATIONS

"Reflex Delay Line Memory Clock" by Dohermann in IBM Tech. Disclos. Bull., vol. 8, No. 1, Jun. 1965, p. 70.

*Primary Examiner*—Stanley D. Miller, Jr.
*Attorney, Agent, or Firm*—John S. Solakian; Nicholas Prasinos; Ronald T. Reiling

[57] ABSTRACT

A clock cycle is provided by a delay device, the output of which is coupled via an inverter to the input thereof, which inverter is combined in a gate structure so as to enable such clock cycle and derivative clock pulses coupled to be generated as a signal passes through the delay device. The gate structure is coupled to receive a so-called stall signal inhibiting the clock system from generating an output. The stall signal so inhibits such clock system only after the present clock cycle is completed. Further, the gate structure is coupled so that a stall signal received and then cleared before the end of the clock cycle will have no effect on the system. The system also responds to a removal or clearing of a stall signal by immediately beginning another clock cycle after the relatively insignificant delay introduced by the gate structure.

10 Claims, 3 Drawing Figures

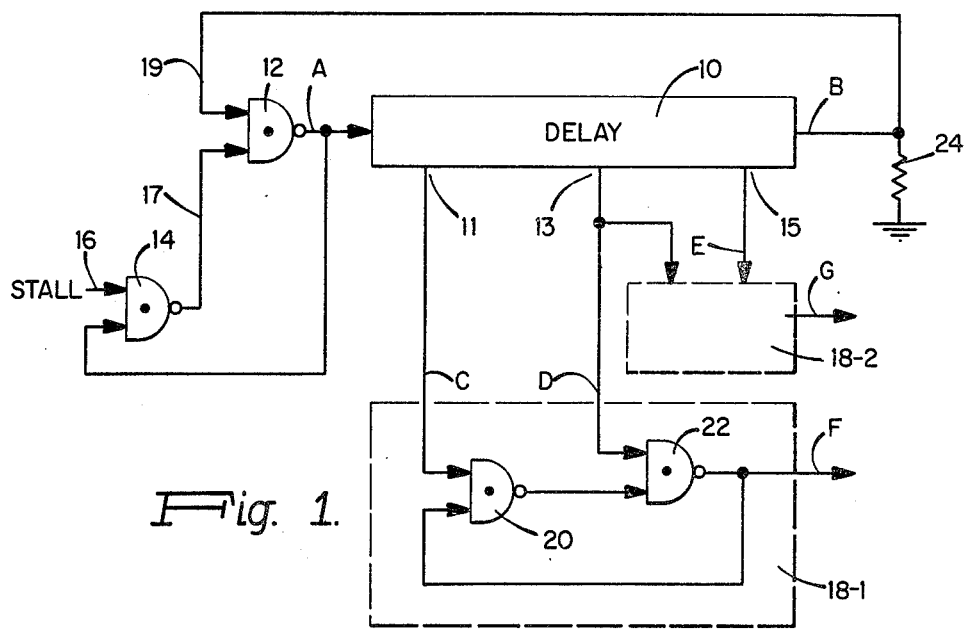
Fig. 1.
| IN 1 | IN 2 | OUT |
|---|---|---|
| 1 | 1 | 0 |
| 0 | 1 | 1 |
| 1 | 0 | 1 |
| 0 | 0 | 1 |
Fig. 2.
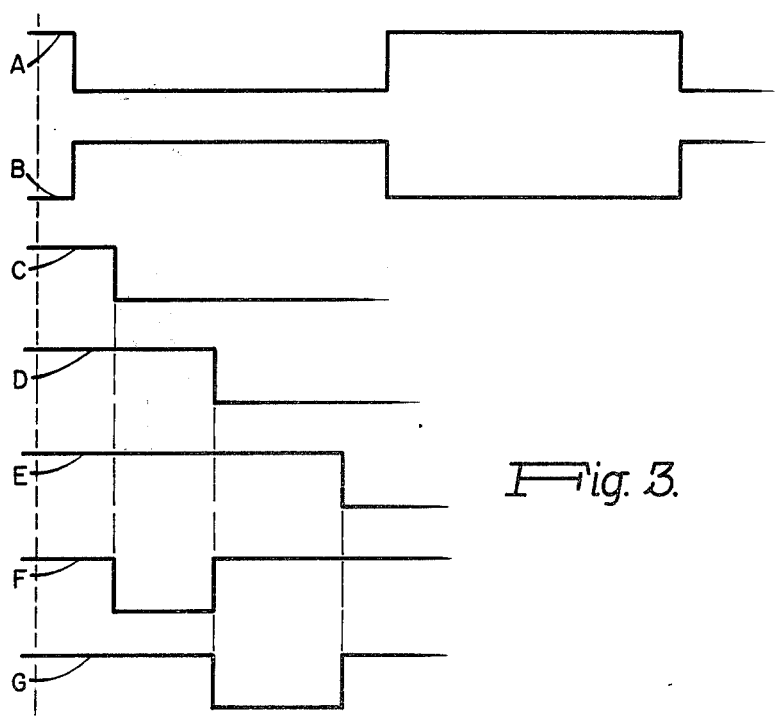
Fig. 3.

CLOCK SYSTEM HAVING ADAPTIVE SYNCHRONIZATION FEATURE

BACKGROUND OF THE INVENTION

The present invention generally relates to data processing systems and more particularly to clock systems utilized in controlling the transfer of information in such data processing systems.

In data processing systems, the transfer of information is typically controlled by clock pulses derived from clock cycles generated by a clock system. The clock system is generally inhibited from generating clock pulses when information is not to be strobed into the receiving element so as to prevent the transfer of erroneous information or loss of information thereby creating an error condition. Accordingly, a stall signal or condition is generated. A typical example of a stall condition may be for example that condition under which a utilizing element such as a central processor is waiting for the data processing system's memory to provide information thereto. When the receiving element is expecting the information from the memory, the clock pulse is not generated for strobing in the information to the receiving element, particularly if there is an indication that the memory will not be providing such information for possibly another clock cycle. Accordingly, a stall condition is generated which however, upon an indication that the information will be presently transfered, will be cleared so as to generate another clock cycle and the clock pulses derived therefrom. It is important in such clocking systems that the clock cycle be enabled to start up again in a minimum period of time. It is also important that a stall signal not interrupt the clock cycle being presently generated. In one prior art system which uses a crystal clock, such system is not capable of being started up after being stopped until the next crystal frequency pulse is generated. Thus in such prior art system if a start-up is desired, for example, ten nanoseconds after a clock cycle of a hundred nanoseconds has begun, then ninety nanoseconds would have to expire before the system could be started up again.

It is accordingly a primary object of the present invention to provide a clock system which is adaptive in design so as to provide synchronization or start up of a clock cycle in a minimum period of time.

SUMMARY OF THE INVENTION

The above stated objects are achieved according to the present invention by providing a clock system having a delay element such as a delay line which has an associated delay period. The system further comprises apparatus, including the delay element, for generating a clock cycle which is at least two such delay periods in duration. Logic is further provided and coupled with the delay means for producing a clock pulse during such clock cycle, such clock pulse having a duration which is less than that of the clock cycle. A control input coupled to gate logic is coupled to receive a signal having either a first state or a second state, the first state operative to enable the clock system to generate the clock cycle and the second state operative to disable the clock system from generating such clock cycle. The system further includes apparatus, included in such gate logic, which is responsive to a change in such control signal from such second state to the first state, for enabling the generation of the clock cycle in an adaptive manner with only minimum delay.

BRIEF DESCRIPTION OF THE DRAWINGS

The above and other objects of the present invention are achieved in the illustrative embodiment as described with respect to the figures in which:

FIG. 1 is a logic block diagram of apparatus of the present invention;

FIG. 2 is a truth table for a well known NAND gate; and

FIG. 3 includes waveforms illustrative of the operation of the apparatus of FIG. 1.

DETAILED DESCRIPTION OF THE PREFERRED EMBODIMENT

FIG. 1 illustrates the apparatus of the present invention. Such apparatus or clock system is utilized for generating a clock cycle from which clock pulses are derived. The clock cycle is generated basically by the use of the delay element 10, which may in a preferred embodiment be a delay line, and the inverting function of NAND gate 12. This is a well known technique by which a change in level at the output of gate 12 as depicted by waveform A of FIG. 3 is propagated and thereby produces through the delay line 10 waveform B of FIG. 3. A clock cycle has a period equal to twice the delay time of the delay element 10 and the delay of NAND gate 12. It is noted that waveform B, for purposes of simplifying the discussion relating to the operation of the present invention, has been shown as if there were no delay associated with either NAND gate 12 or 14. It is noted, however, and assuming the delay of NAND gate 12, that the duration of each level of the square waves represented by waveforms A and B would be equal to the delay time of delay element 10 plus the delay produced by NAND gate 12 and that waveform A would be delayed from the timing of waveform B by the delay time of NAND gate 12. It is noted that resistor 24 is included at the output of delay element 10 in order to provide the proper termination circuit, thereby reducing signal reflections and noise in the system. The simple use of this delay element 10, inverter function and terminating resistor 24 to produce the square wave is well known in the art.

It is also well known to tap off from such delay element 10 anywhere from the input thereof to the output thereof with one or more circuits in order to provide a clock pulse during the clock cycle. By way of example, two such circuits are shown in the apparatus of FIG. 1. Such circuits are shown as latching circuits 18-1 and 18-2. Circuit 18-2 is similar to circuit 18-1 and accordingly is not shown in detail. As shown, the pulse produced by logic 18-2 starts when a pulse produced by logic 18-1 terminates, because of the common tap for the two circuits.

The operation of representative logic 18-1 is as follows. As can be seen by waveform A, the change in state from a high level to a low level, i.e., from a binary one to a binary zero, propagates through the delay line until received at point 11, at which time such resulting signal as shown by waveform C is received at the top input of NAND gate 20. This causes such top input of NAND 20 to change from a binary one to a binary zero, it being noted that the bottom input of NAND gate 20 is already in the binary one state. Thus, initially, both inputs to NAND gate 20 are binary ones and the output thereof is a binary zero as indicated by the truth table of FIG. 2. Therefore, the bottom input of NAND gate 22 is a binary zero and the top input is a binary one. When the top input of NAND gate 20 goes to a binary zero state, the output of NAND gate 20 changes to a binary one state and accordingly with the binary one state at both inputs of NAND gate 22, the output thereof, as represented by waveform F, goes from a binary one state to a binary zero state. When such negative going transition is received at point 13 at the top input of NAND gate 22, the top input is accordingly a binary zero and the output of NAND gate 22 as represented by waveform F, goes back to a binary one state. The latching circuit 18-2 operates in the same way and is triggered when a negative going waveform is received at point 13 and is again triggered to terminate the pulse when a negative going waveform is received at point 15. This is represented by waveform G.

The square wave or clock cycle, as represented by waveform A, is accordingly repeated unless in fact NAND gage 12 is effectively disabled. Normal conditions, i.e., with no stall condition for the NAND gates 12 and 14 are as follows. The bottom input 17 of NAND gate 12 is normally a binary one state. Such binary one state thereby enables NAND gate 12 to be controlled by the control input 19, i.e., the top input of NAND gate 12 so as to reproduce the binary state on control input 19 at the output of NAND gate 12 as represented by waveform A, waveform A being the inversion of the input on line 19. Referring to the truth table of FIG. 2, it can be seen that if the input, in this case as shown by the truth table by Input 2, is a binary one, then the output of the NAND gate will be the inversion of Input 1.

The inputs to the NAND gate 14 are the stall control line 16 at the top input thereof and the output of NAND gate 12 at the bottom input thereof. The stall signal is normally a binary zero indicating that there will not be any stall or delay in generating the clock cycle. Accordingly the clock cycle will continue to be generated in a repetitive manner. Because of the fact that the stall signal on line 16 is a binary zero under what will be termed as normal conditions, the output of NAND gate 14 will remain in the binary one state thereby providing a binary one signal on line 17 to enable such normal operation, independent upon whether waveform A is in the binary one or binary zero state. This is true because as can be seen from the truth table, the only time that a binary zero may be generated at the output of a NAND gate is when there are two binary one inputs, and accordingly, the stall input being a binary zero, a binary zero output cannot be generated.

As shall be presently explained, when a stall signal is received, i.e., when the stall signal becomes a binary one, the apparatus of the present invention will not be interrupted or stopped until in fact such apparatus completes the present clock cycle, i.e., at the time the stall signal goes to the binary one state. Further, as shall be explained, a stall signal in the binary one state received during a clock cycle and which returns to a binary zero state during the same clock cycle will have no effect on the system. This means that, for example, the device generating such binary one stall signal, and which device changes its intent to cause a stall condition, will have no effect upon the generation of such clock cycle if in fact such stall signal becomes a binary one and then a binary zero during the same clock cycle. This, as can be seen, further provides an advantage of the present invention in that the noise on the stall line 16 will not cause any errors in the system since in fact noise will be generated typically for only a short period of time. It shall be further explained, that the clock system of the present invention is adaptive to commence the generation of further clock cycles after being stalled by the binary one stall signal when in fact the stall signal again becomes a binary zero. Such clock cycle generated after the stall signal goes from the binary one state to the binary zero state is so generated without any delay except for the propagation and gate delays which are inherent in the system. It should be understood that clock pulses may have been provided during the latter half of the clock cycle by utilization of inverters at selected delay element 10 tap points and that such clock pulses during the latter half of the clock cycle would not have been interrupted for the same reasons as noted above.

Assuming that waveform A is in the beginning of the clock cycle, i.e., that waveform A has just gone from the high binary one state to the low binary zero state, and assuming that the binary one state of the stall signal has been received on line 16, the output of NAND gate 14 continues to be a binary one. Accordingly the normal operation of the clock system continues. This is true because a binary zero state at the respective inputs of a NAND gate as indicated by the truth table of FIG. 2 will produce a binary one output. When waveform A goes from the binary zero state to the binary one state, the output of NAND gate 14 will change. However, it is noted that by the time wavefrom A goes back from the binary zero state to the binary one state, that in fact the clock pulse as indicated by waveforms F and G have already been generated. Accordingly there is no effect by the stall signal on the clock pulses as indicated by waveforms F and G. Thus, when the bottom input of NAND gate 14 goes from the binary zero state to the binary one state, binary ones will be at both inputs of NAND gate 14 and the output thereof will be a binary zero on line 17, which is one input to NAND gate 12. With a binary zero on line 17, the output of NAND gate 12 will become a binary one and will remain a binary one independent of the binary state of the signal on line 19. Thus, waveform A will continue to be in the binary one state for the second half of the clock cycle and thereafter until the stall signal is terminated, i.e., until the stall signal goes back to the binary zero state.

At such time that the stall signal goes back to the binary zero state, the output of NAND gate 14 will, after the gate delay of NAND gate 14, become a binary one and accordingly will enable NAND gate 12 to pass in inverted form the binary state received on line 19, to the input of delay element 10. Since the waveform on line 19 is in the binary one state, then this will mean waveform A will in fact go to the binary zero state thereby starting the clock cycle without delay except for the gate delays introduced by NAND gates 14 and 12 in succession. Thus, it has been seen that the stall signal, when received during a clock cycle, will not interrupt the generation of such clock cycle, nor the generation of the clock pulses during such clock cycle, and it has further been seen that the clock cycle will begin again in an adaptive manner within two gate delays after the stall signal has terminated, i.e., has gone to the binary zero state.

It can be further seen that if a stall signal in the binary one state is received on line 16 during the first half of the clock cycle, i.e., when waveform A is in the binary zero state, and terminates, i.e., such stall signal goes back to the binary zero state, while waveform A is still in the binary zero state or in fact after it has gone to the binary one state in the second half of the clock cycle, that the operation of the clock system will not be interrupted. This is so because as has been discussed hereinabove, the change in the output of NAND gate 14 was not seen until in fact waveform A went from the binary zero state back to the binary one state. Further, by the illustrated embodiment, the clock pulses as represented by waveforms F and G had already been generated.

It can also be seen that due to the nature of the operation provided by such stall signal, that the system may be initialized so that in fact the first clock cycle starts with waveform A going from a binary one to a binary zero state. Such initialization may for example occur after the circuit is first powered up, i.e., energized, at which time the stall signal would be provided in the binary one state, and thereafter, for initialization purposes changed to the binary zero state so as to start the clock cycle at the beginning thereof.

It can thus be seen that the apparatus of the present invention provides a clock system which is responsive to a stall signal but only after the completion of the current clock cycle, and only if such stall signal continues after the completion of the current clock cycle, it being noted that such clock system provides the advantage of not responding to such stall signal if such stall signal is removed during the present clock cycle. It has further been seen that yet another feature of the present invention is that such clock cycle is immediately initiated after a given short duration after the stall signal is removed. It can also be seen that such functions may be accomplished for example with different logic structure or a different arrangement of gating elements without departing from the scope of the present invention.

Having described the invention, what is claimed as new and novel for which it is designed to secure Letters Patent is:

1. A clock system comprising:
   A. delay means having a delay period, said delay means having an input and an output;
   B. means, including said delay means, for generating a clock cycle which is at least two said delay periods in duration;
   C. logic means, coupled with said delay means, for producing a clock pulse during said clock cycle, said clock pulse having a duration which is less than that of said clock cycle;
   D. gate means having a control input, said gate means comprising
      1. first and second gate elements, each having first and second inputs and an output, wherein the first input of said second gate element is said control input,
      2. means for coupling the output of said delay means to the first input of said first gate element,
      3. means for coupling the input of said delay means and the output of said first gate element to the second input of said second gate element, and
      4. means for coupling the output of said second gate element to the second input of said first gate element; and
   E. means for receiving a control signal at said control input of said gate means, said control signal having either a first level or a second level, said first level operative to enable said clock system to generate said clock cycle and said second level operative to disable said system from generating said clock cycle, whereby said clock cycle is initiated in a minimum period of time following the transition of said control signal from said second level to said first level.

2. A system as in claim 1 wherein said delay means is a delay line.

3. A system as in claim 1 wherein said logic means comprises:
   A. first and second gate elements, each having at least first and second inputs and an output and wherein the output of said second gate element is coupled to provide said clock pulse;
   B. wherein said delay means includes at least a first and a second electrical connection tap, said first tap being closer to said input of said delay means than is said second tap;
   C. means for coupling said first input of said first gate element to said first tap and said first input of said second gate element to said second tap so that a signal received at said input of said delay means is first received at said first input of said first gate element;
   D. means for coupling the output of said first gate element to the second input of said second gate element; and
   E. means for coupling the output of said second gate element to the second input of said first gate element.

4. A system as in claim 1 wherein said first and second gate elements are NAND gates.

5. A system as in claim 1 wherein a change in said control signal from said first level to said second level enables said means for generating to complete the generation of said clock cycle, which said clock cycle is being generated at the time said control signal changed from said first level to said second level.

6. A system as in claim 1 wherein a change in said control signal from said first level to said second level enables said means for generating to continue to generate a present said clock cycle which said present said clock cycle is being generated at the time said control signal changed from said first level to said second level, and wherein a change in said control signal from said second level to said first level during said present said clock cycle enables said means for generating for generating another said clock cycle directly following said present said clock cycle.

7. A clock system comprising:
   A. delay means having a delay period, said delay means having an input and an output, said delay means also including at least a first and a second electrical connection tap, said first tap being closer to said input of said delay means than is said second tap;
   B. means, including said delay means, for generating a clock cycle which is at least two said delay periods in duration;
   C. logic means, coupled with said delay means, for producing a clock pulse during said clock cycle, said clock pulse having a duration which is less than that of said clock cycle, said logic means comprising
      1. first and second gate elements, each having at least first and second inputs and an output and wherein the output of said second gate element is coupled to provide said clock pulse,
      2. means for coupling said first input of said first gate element to said first tap and said first input of said second gate element to said second tap so that a signal received at said input of said delay means is first received at said first input of said first gate element,
3. means for coupling the output of said first gate element to the second input of said second gate element, and
4. means for coupling the output of said second gate element to the second input of said first gate element;

D. gate means having a control input;
E. means for receiving a control signal at said control input of said gate means, said control signal having either a first level or a second level, said first level operative to enable said clock system to generate said clock cycle and said second level to disable said system from generating said clock cycle;
F. means, included in said gate means and responsive to a change in said control signal from said second level to said first level, for enabling the generation of said clock cycle.

8. A clock system comprising:
A. delay means having an input and an output and an associated delay period;
B. gate means having first and second inputs and an output, said gate means comprising
 1. a first gate element having first and second inputs and an output, wherein the output of said first gate element is the output of said gate means and wherein the first input of said first gate element is the first input of said gate means,
 2. a second gate element having first and second inputs and an output, wherein the first input of said second gate element is the second input of said gate means,
 3. means for coupling the output of said second gate element to the second input of said first gate element, and
 4. means for coupling the output of said first gate element to the second input of said second gate element;
C. first means for coupling said output of said delay means to said first input of said gate means;
D. second means for coupling said output of said gate means to said input of said delay means;
E. means, including said gate means, said delay means and said first and second means for coupling for generating a clock cycle which is at least two said delay periods in duration; and
F. means for receiving a control signal at said second input of said gate means, said control signal having either a first or second level, said first level operative to enable said clock system to generate said clock cycle and said second level operative to disable said system from generating said clock cycle, whereby said clock cycle is initiated in a minimum period of time following the transition of said control signal from said second level to said first level and whereby the use of said clock signal enables said clock cycle to provide adaptive synchronization for the transfer of information in a data processing unit which includes said clock system.

9. A system as in claim 8 wherein said first and second gate elements are NAND gates.

10. A system as in claim 8 further comprising logic means, coupled with said delay means, for producing a clock pulse during said clock cycle, said clock pulse having a duration which is less than that of said clock cycle.

* * * * *